US005889578A

United States Patent [19]

Jamzadeh

[11] Patent Number: 5,889,578

[45] Date of Patent: Mar. 30, 1999

[54] METHOD AND APPARATUS FOR USING FILM SCANNING INFORMATION TO DETERMINE THE TYPE AND CATEGORY OF AN IMAGE

[75] Inventor: Feraydoon Shahjahan Jamzadeh, Fairport, N.Y.

[73] Assignee: Eastman Kodak Company, Rochester, N.Y.

[21] Appl. No.: 143,512

[22] Filed: Oct. 26, 1993

[51] Int. Cl.$^{6}$ .............................. H04N 9/11; G03B 27/52

[52] U.S. Cl. ................................ 355/41; 348/97; 355/38; 355/77

[58] Field of Search ................................ 355/38, 41, 77; 358/80; 356/444; 348/97

[56] References Cited

U.S. PATENT DOCUMENTS

| | | | |
|---|---|---|---|
| 3,523,728 | 8/1970 | Wick et al. | 355/32 |
| 3,708,676 | 1/1973 | Huboi et al. | 250/219 |
| 3,790,275 | 2/1974 | Huboi et al. | 355/68 |
| 4,785,330 | 11/1988 | Yoshida et al. | 355/14 |
| 5,023,656 | 6/1991 | Terashita | 355/41 |
| 5,053,808 | 10/1991 | Takagi | 355/38 |
| 5,126,856 | 6/1992 | Abe | 358/406 |
| 5,157,482 | 10/1992 | Cosgrove | 358/54 |
| 5,159,444 | 10/1992 | Shimizu | 358/76 |
| 5,161,204 | 11/1992 | Hutcheson et al. | 382/16 |
| 5,274,714 | 12/1993 | Hutcheson et al. | 382/15 |
| 5,278,921 | 1/1994 | Nakamura et al. | 382/18 |

*Primary Examiner*—Safet Metjahic
*Assistant Examiner*—Michael Dalakis
*Attorney, Agent, or Firm*—Leonard W. Treash

[57] ABSTRACT

Classifying and detecting original images on a roll of film so that a photographer can describe and identify to the photofinisher the type of images of interest to the photographer and to identify which images by category on the roll of film are to receive certain customer requested procedures such as multiple prints, enlargements or no printing of that image at all.

36 Claims, 6 Drawing Sheets

METHOD AND APPARATUS FOR USING FILM SCANNING INFORMATION TO DETERMINE THE TYPE AND CATEGORY OF AN IMAGE

BACKGROUND OF THE INVENTION

1. Field of the Invention

The present invention relates to an image-forming apparatus and more particularly to a multiple image-forming system for synthesizing and forming a plurality of images having different characteristics identified in the original scanning of the film.

2. Description of the Prior Art

Generally, originals may be classified to help in the detection and recognition of several types of images on a roll of film. This classification process is used to expose the photographic paper properly to produce more pleasing prints.

U.S. Pat. No. 3,790,275, issued to Huboi et al on Feb. 5, 1974, discloses both a method and apparatus with a capability of automatically identifying the type of image present in the originals. Based on the results of such identification, the image-forming apparatus selects the proper light-sensitive materials and exposure conditions according to the type of the original of interest and to expose the photographic paper properly in order to produce the most pleasing prints of that subject matter.

U.S. Pat. No. 3,708,676, issued to Huboi et al on Jan. 2, 1973, discloses an apparatus that samples the density of central portions of a frame on a negative and determines the optimum exposure setting for printing that frame onto photographic paper. In calculating the optimum exposure setting, the average color densities in the red, green and blue channels are considered simultaneously to prevent color subject failures.

U.S. Pat. No. 5,053,808, issued in the name of Takagi on Oct. 1, 1991, describes a photographic copier using as its input reflection documents. By pre-scanning the document on its platen, the copier discriminates three different types of input images such as: photographs, printed material and black-and-white images. Based on the type of input, it corrects the exposure step to ensure proper copying. It also teaches how to use histograms to isolate document areas from non-document areas when undersized prints are copied.

U.S. Pat. No. 4,785,330, issued to Yoshida et al on Nov. 15, 1988, describes a black-and-white electrophotographic copier that through a pre-scan cycle discriminates between three types of inputs on a single sheet. The types of input recognized are text and charts on normal white background, text and charts on non-white background (newspaper clippings) and photographs. For each type of input detected, the copier reproduces that input with a complete electrophotographic cycle specifically tuned for that type. This type procedure requires three separate exposures, three development cycles, three image transfers and three fusing operations to create a single sheet that contains normal text, newspaper text and photographs. The recognition algorithm analyzes the entire pre-scan data and based on predetermined density levels, decides which of those input conditions are present and where each input type is located.

None of the methods or apparatus set forth above that determine image content recognition based on predetermined density levels are able to identify the contents of typical scenes exposed on photographic films. Identification of image content is not used to respond to customer generated requests, but instead are used to improve print quality.

SUMMARY OF THE INVENTION

The present invention can recognize or identify at least three different types of images on a roll of film automatically such as portrait (close-ups), outdoor scenes and scenes illuminated with an electronic flash. A customer can then select or identify specific images on a roll of film and may select from a number of options as to how the selected images are to be treated during the printing operation. The customer, for example, may select the same number of prints or desire to exclude the selected frame from any printing or may decide to request enlargements of the selected frame. A customer that can remember the general content of the images on the film can reduce the number of trips to a photofinisher and also reduce the expense of receiving extra prints or reduce costs by eliminating the printing of defective images on the film. The cost of the extra prints would be minimal because the primary cost for reprints is the labor portion for locating and exposing the correct frame of film. This is evidenced by the fact that it is currently popular to offer double (sometimes triple) prints at no extra charge.

The present invention further provides an apparatus for making prints from a strip carrying a plurality of distinct printable image frames. The apparatus comprises a means for inputting the number of prints to be made of particular ones of the image frames and a criterion representing a characteristic of the image characterization within an image frame that is to be used to identify the particular image frame. There is also means for scanning the image within each image frame and generating signals representing the images scanned with means for analyzing the scanned image and the particular image frames based on the criterion and means for printing the particular images according to the number inputted having those characteristics of the particular image frames.

The invention further provides a method of selectively making prints from a film strip carrying at least a plurality of distinct printable images. The method comprises the steps of generating data by scanning the images on the film strip and using image-related characteristics for distinguishing between printable images. Then storing and using the data to locate images having image-related characteristics and printing all printable images wherein different numbers of prints are made of the printable images having the image-related characteristics than are made of the printable images not having the image-related characteristics.

The above and other objects and features of the present invention will become apparent from the following detailed description and the appended claims with reference to the accompanying drawings.

DESCRIPTION OF THE PREFERRED EMBODIMENT

This invention is aimed at reducing the amount of time an advanced amateur photographer spends at their local photofinisher as well as reducing the number of trips made to the photofinisher's shop. Here is a typical scenario illustrating how the present invention would apply. On a single 24-exposure roll of film, the following scenes are shot: (1) several group exposures using an electronic flash from a family reunion of the photographer; (2) a couple of outdoor exposures from the photographer's backyard garden; and (3) several close-up shots from photographer's graduating son. On his first trip to the photofinisher, in an effort to save time and money, the photographer drops off the film roll along with the following instructions: (1) make four copies each of the group scenes; (2) make 8R (8"×10") enlarged prints from the garden scenes; and (3) make normal prints (usually 4Rs, 4"×6") from the rest of the roll. These descriptions of what the particular images contain is being defined herein as print characterization which is a general description by the customer of what an image contains.

Printer capabilities disclosed in U.S. Pat. Nos. 4,994,827, issued on Feb. 19, 1991 and 5,151,717, issued on Sep. 29, 1992, both to Jamzadeh et al, disclose electronic high quality printers that can print multiple size photographs simultaneously side by side.

Figure 1:
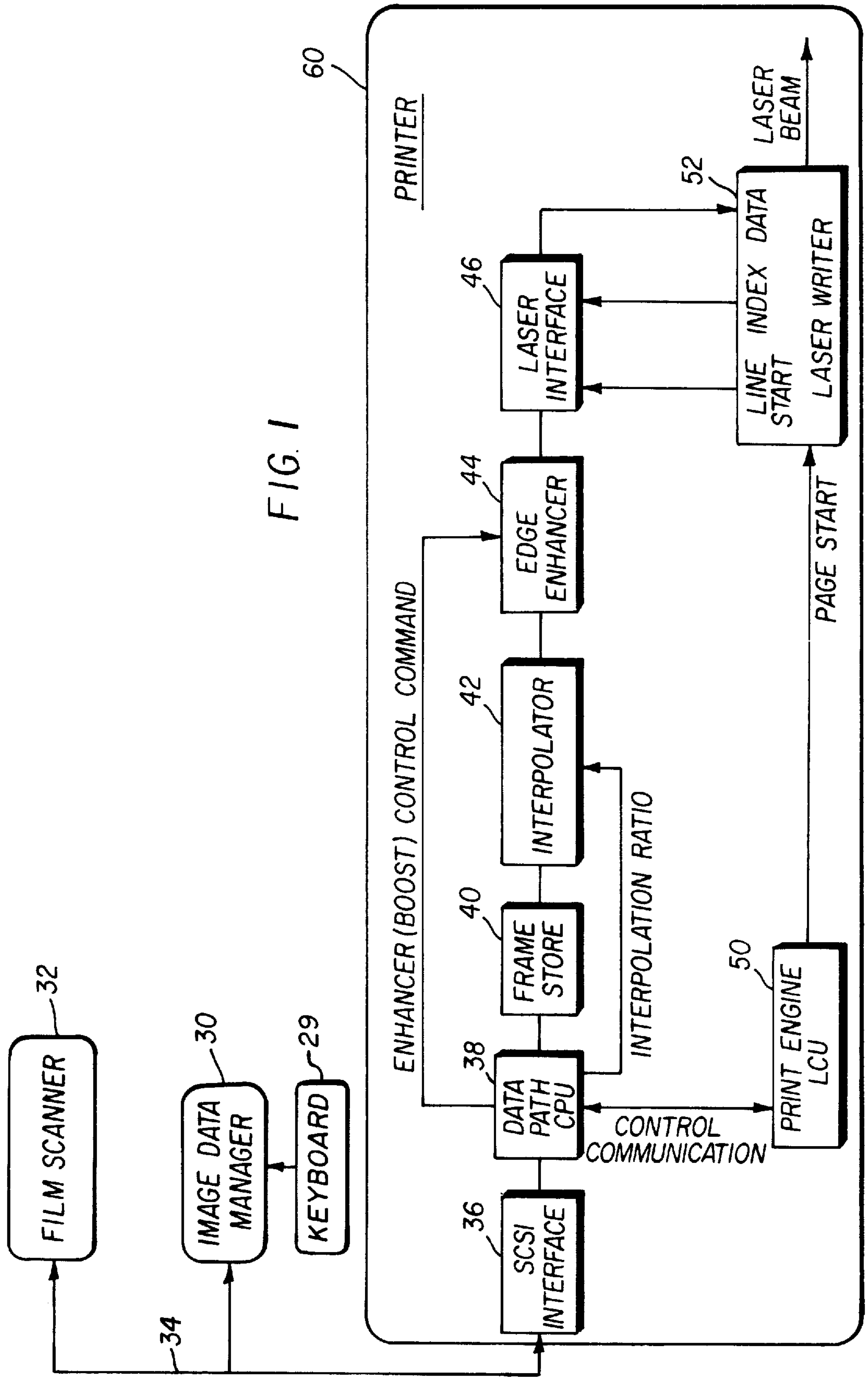
FIG. 1 is a schematic block diagram according to the present invention.

FIG. 1 shows the block diagram of the preferred apparatus where the Image Data Manager 30 (IDM) is a computer that controls the overall operation of the system by monitoring the performance and controls the functions of scanner 32 and printer 60. The IDM also creates and/or modifies some of the images to be printed. The IDM could be a low-cost general purpose personal computer or a high performance work station, depending on the level of performance.

The scanner 32 is a CCD based scanner that can scan photographic rolls of film and it can operate at a number of different resolutions. The scanner can scan images as well as text and graphics from a fixed format film, typically 35 mm film. In this application, the scanner reads images off the film in three resolutions. At the lowest resolution, 128 pixels by 192 lines are read (typically 31 dpi) from each frame during the pre-scan stage. When normal size prints are to be made, i.e., 3R, 4R and 5R, those film frames are scanned at medium resolution of 1024 pixels by 1536 lines (250 dpi). When enlarged prints are requested, like 8R and 12R, it will scan the film at the highest resolution of 2048 pixels by 3072 lines (500 dpi).

The decisions to scan which film frames and at what resolution is made by the IDM 30. The IDM analyzes the pre-scan data and identifies the frames and the characteristics and type of those images, as explained later. Based on this identification and the customer's request for different size prints, different frames are scanned for the second time at medium or high resolution.

The communication channel 34 is the connecting link among the IDM, scanner and the printer. It could be a computer network link or any of the commonly used computer communication interfaces like SCSI or GPIB. The communication interface module 36 inside the printer 60, will match the type of communication chosen for communication channel 34.

The data path CPU 38 separates the print data from printing instructions and commands. The instructions that deal with the physical operation of the printer are separated and sent to the print engine logic and control unit (LCU) 50. The print data comprised of images, graphs and texts are sent for temporary storage to frame store 40. The printing instructions that relate to the data path are executed by data path CPU 38. These instructions include the settings for the interpolator 42 and edge enhancer 44. The CPU 38 usually takes the form of a general purpose micro-processor.

The frame store 40 is where print data is stored before printing. In electrophotographic printers, once the exposure process for one separation begins, the printer cannot be stopped until the entire separation is exposed. Because of this requirement, the frame store must be large enough to store at least one full separation. U.S. Pat. No. 5,175,628, issued on Dec. 29, 1992 to Jamzadeh et al, shows how a frame store could be utilized effectively to store and retrieve multiple image separations simultaneously.

U.S. Pat. No. 5,125,042, issued to Kerr et al on Jun. 23, 1992 describes the details of an interpolator that could be used in this invention in interpolator block 42. Such an interpolator can be used to enlarge or reduce a digital image and include an interpolator coefficient memory containing interpolation coefficients representing a one dimension interpolation kernel. A row interpolator receives image pixel values and retrieves interpolation coefficients from the memory, and produces interpolated pixel values by interpolating in a row direction. A column interpolator receives multiple columns of interpolated pixel values from the row interpolator, and retrieves interpolation coefficients from the memory to produce rows of interpolated pixel values by interpolating in the column direction.

U.S. patent application Ser. No. 08/078,539, filed on Jun. 17, 1993 explains the details of construction and operation of an edge enhancer that could be applied to enhancer block 44 in the present disclosure. That edge enhancer gradually reduced the level of edge enhancement for each successively formed color separation image. For example, the edge enhancement of the second color separation may only be half that of the first color separation image, and that of the third separation may be only half that of the second color separation.

The laser interface 46 buffers the print data and synchronizes the data path with the mechanical requirements of the laser writer 52. This includes proper clocking of each raster line as the facets of the polygon/hologon spinner control the scanning of the laser diode beam.

The LCU 50 controls the mechanical operation of printer 60. It controls the actuations of the paper handling subsystem as well as the development stations and fusing mechanism (not shown). It also controls the positioning of the final print on the paper, by issuing the page-start signal to laser writer 52 at the proper time.

Attention is now turned to the procedures that the photofinisher will follow to comply with the photographer's order.

The roll of film is first processed and then inserted into film scanner 32 where the film is scanned twice by the film scanner. The initial scan, or the pre-scan, typically collects 192 by 128 pixels of data for each frame (image). This data is quickly read and sent to IDM computer 30 for frame line detection, scene balance algorithm computations and subject failure detection. U.S. Pat. No. 5,157,482, issued on Oct. 20, 1992 to Cosgrove further explains how the pre-scan data is used to locate the frames on the film (frame line detection) and determine the proper exposure level (scene balancing). In operation, a plurality of color photographic images that have been captured in a continuous color photographic film strip are pre-scanned at low resolution and then re-scanned at high resolution by an opto-electronic scanning device and processed for storage as a plurality of digitized images in a digital imaging data base. The film strip contains notches to spatially locate pre-scan frame data during re-scan. During pre-scan, the film strip is translated past the opto-electronic scanner in a first direction to obtain a plurality of first digitally encoded images. During high resolution re-scan, the film is translated in the reverse direction. The high resolution imaging data is mapped into image storage memory on the basis of the contents of respective first digitally encoded images. During the re-scan, the mapping process is calibrated on the basis of information contained on the film strip other than the notches, such as interframe gaps. This initial scan information will allow scanner 32 to do the second scan properly. The pre-scan data is processed by the IDM 30 similar to Huboi et al algorithm in U.S. Pat. No. 3,790,275, apparatus for use with optical printers in order to distinguish outdoor shots from flash-exposed scenes. This will allow the photofinisher to distinguish the family reunion frames on the roll from the backyard frames, just as the photographer had requested.

Figure 2A:
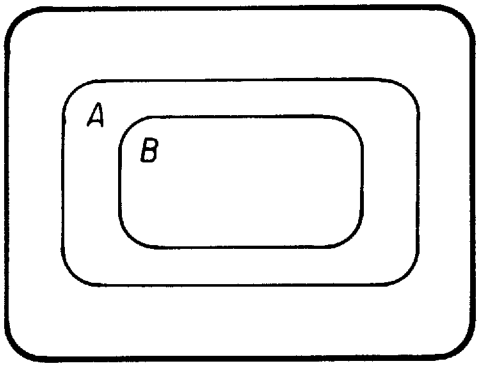
FIGS. 2*a*–2*d* show various templates illustrating how the image could be segmented in order to identify specific image types such as portraits that would contain large amounts of flesh tones in zone B.
Figure 2B:
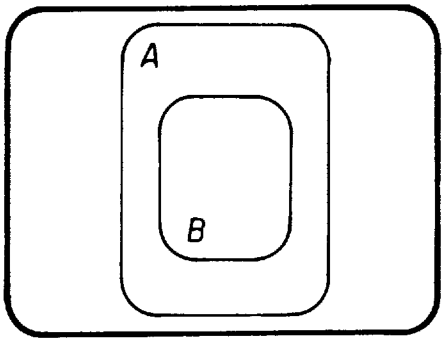
Figure 2C:
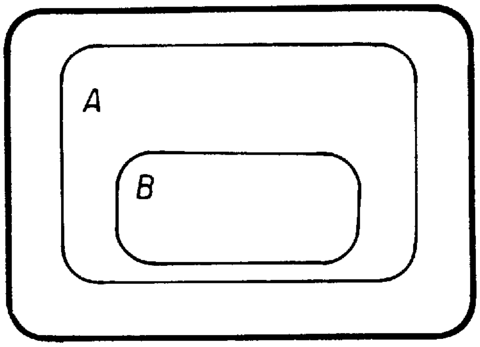
Figure 2D:
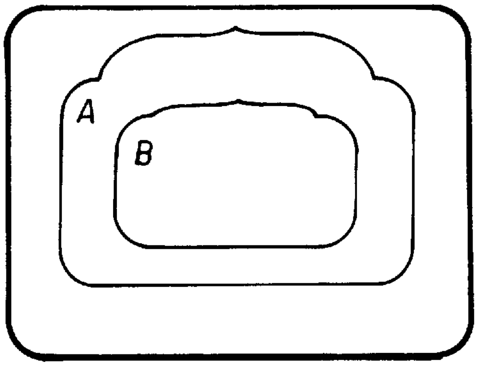

Because most of the flash intensity is focused on the center of the scene, generally segmenting the pre-scan data of each frame into several centralized sections using templates as shown in FIGS. 2*a*–2*d*, allows one to analyze the average image densities in these areas. In frames where a flash was used, the average density of the innermost section would be lighter than all the other sections, and section A would have densities lighter than the outermost region. Different shapes and locations for the segments could be tried to make the algorithm more robust, as shown in FIGS. 2*a*–2*d*. If the above conditions apply, then one could determine with reasonable certainty that the frame was exposed indoors using a flash. FIG. 2*b* shows the segmentation procedure most suitable for vertically exposed scenes. FIG. 2*c* is most applicable for scenes with large background areas, i.e., large areas of wood paneling where the wall is in the upper peripheral region. FIG. 2*d* would find application in large group pictures, i.e., many rows of individuals lined up in one scene. If in each of these cases, the condition is present in which the central portion of the image is considerably lighter than the surrounding areas, accordingly, a flag is set by the IDM 30 identifying that frame as a flash-exposed frame. When more than one of the above conditions apply, then we could claim with reasonable certainty that the frame was exposed indoors using a flash.

Figure 4:
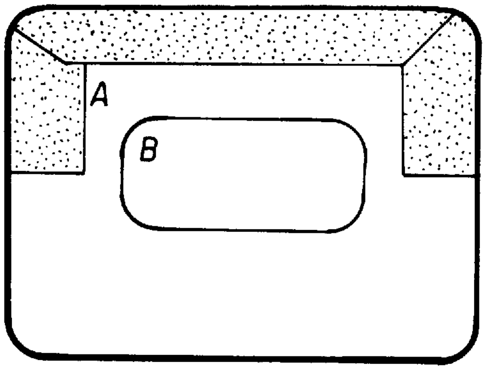
FIG. 4 illustrates templates that may be used with typical outdoor scenes.

The outdoor scenes typically show the opposite conditions of the flash-exposed scenes. That is, the center portions of the frame have higher density than the surroundings. Especially the upper portions of the outer regions of the frame, as shown in FIG. 4, usually contain the blue color of the sky or the white color of clouds, or the combination of the two.

Figure 5A:
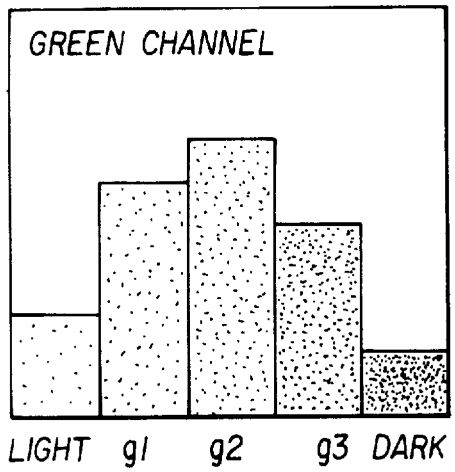
FIGS. 5*a* and 5*b* illustrate color histograms for different color channels that may be encountered in a typical outdoor scene.
Figure 5B:
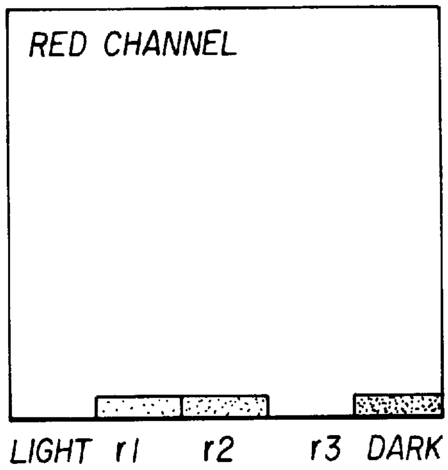

Another technique that applies to outdoor scenes and can further pinpoint what kind of outdoor scene is based on the fact that outdoor scenes that are dominated by a certain feature will show strong color properties once a color histogram is plotted for them. The major (dominant) colors of the frame could be determined by examining these histograms of the three color channels (R,G,B). The outdoor scenes are usually full of certain colors, e.g., green from the trees and grass, blue from the sky and water, white and gray from the snow or clouds, brown from dirt, rocks and sand. FIGS. 5*a* and 5*b* show a five-slot, green and red channel histograms, respectively, of a film frame. The entire density range in red and green channels is divided into five sections. The number of pixels in the frame that contain the lightest shade of green is shown in the slot furthest to the left (FIG. 5*a*). The number of pixels in the frame that contain the next darker shade of green is shown by the slot “g1” (also FIG. 5*a*). The number of pixels in the frame that contain the darkest shade of green is shown by the slot furthest to the right in FIG. 5*a*. If the scene contained trees and grass, its green histograms will be fairly full (see FIG. 5*a*) with moderate to low entries in the blue histogram (not shown), and its red histogram almost empty as shown in FIG. 5*b*.

Figure 6:
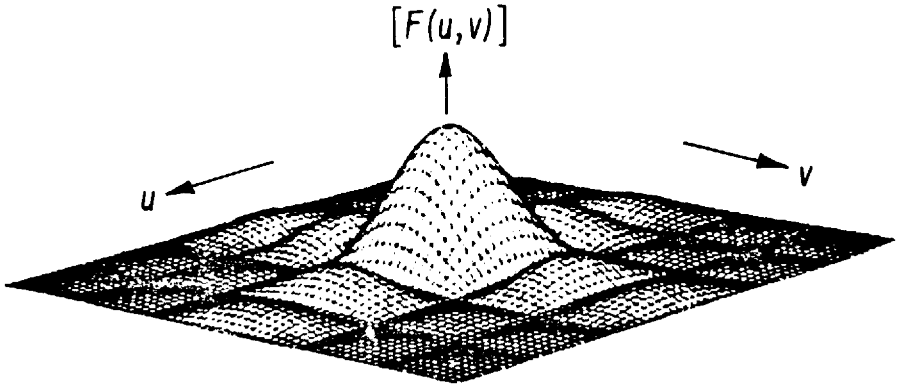
FIG. 6 shows a Fourier transform of the peripheral regions of an outdoor scene.

Another factor used in detecting outside scene is the low spatial frequency of the dominant-color areas. The whites of the clouds and snow or the blues of the sky and the sea, usually do not have too many details (variation) within them. Therefore, if certain color areas of the frame contain rather low spatial frequency details, then this would be another indication of an outside scene. One method to compute image spatial frequency, or a section of it, is to apply two-dimensional Fourier transform. The Fourier transform techniques are explained in most of the fundamental image/signal processing textbooks like “Digital Image Processing” by Rafael C. Gonzalez, Addison-Wesley Publishing, 1977 (pages 36–78) or “Digital Signal Processing” by Alan V. Oppenheim, Prentice Hall, 1975 (pages 115–120). FIG. 6 shows the Fourier transform of peripheral regions of an outdoor scene. Examples of peripheral regions are those highlighted in FIG. 4. The u-axis and v-axis in FIG. 6 corresponds to spatial frequency in the horizontal and vertical directions of the image. As it is shown most of that region contains very low frequency features. If the same was applied to peripheral regions of an indoor scene, considerable high frequency content would appear in FIG. 6. By establishing threshold levels at high spatial frequencies, one could contribute to the differentiation process of outdoor scenes from indoor scenes.

Figure 7:
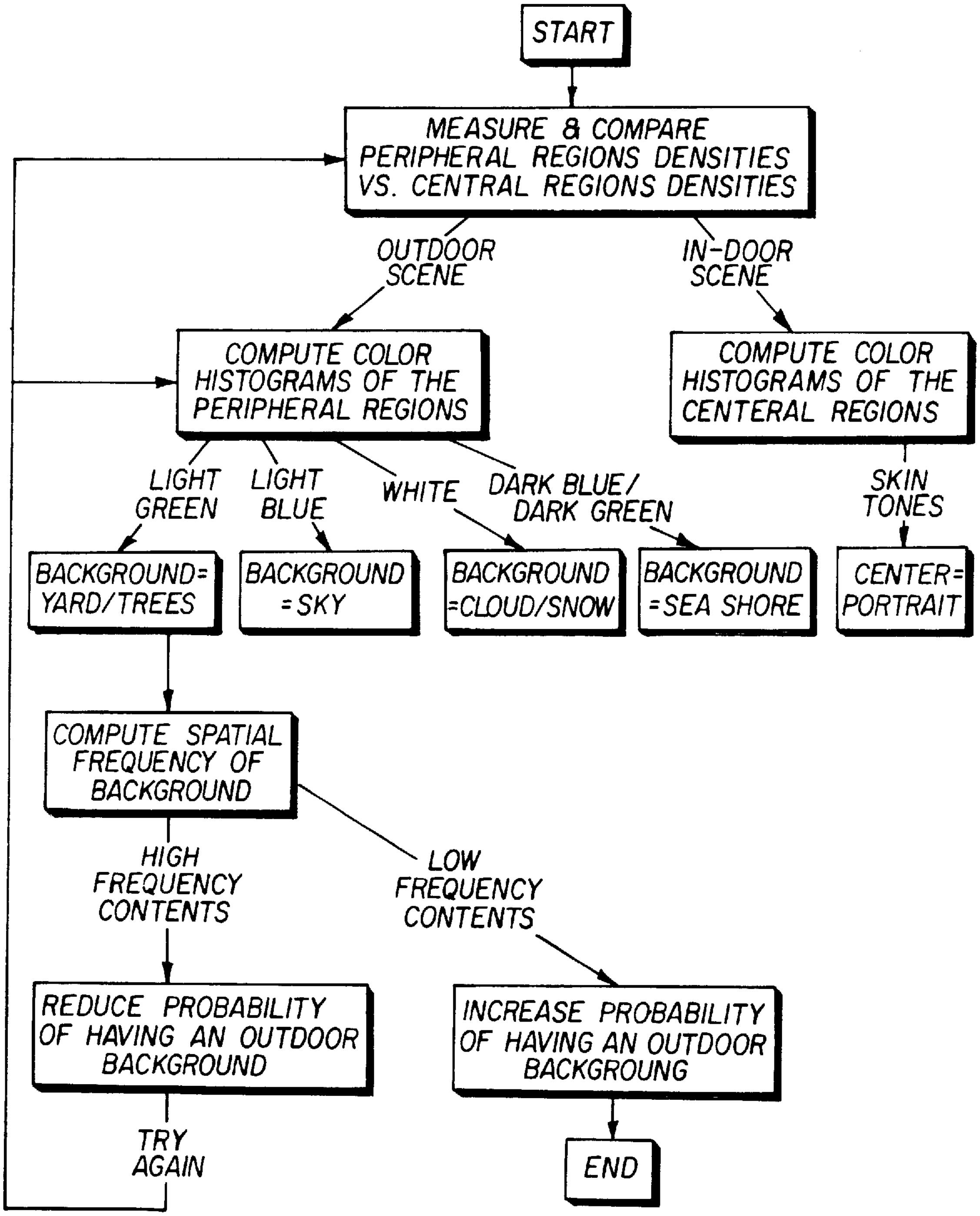
FIG. 7 shows a flow chart for associated with the present invention.

FIG. 7 illustrates the sequence of techniques used in conjunction with the present invention and are discussed here to show how the system may perform with certain print characterizations of those images. There are many more techniques to recognize image contents in the art. In FIG. 7, first it is determined whether the center of image is darker or lighter from the peripheral regions. From that the indoor/outdoor condition is surmised. To determine the type of outdoor images, the histogram of upper outer region is obtained. Once the outdoor type is presumed, it is confined or denied through the spatial frequency test. If denied, the algorithm reverts to the histogram stage and would attempt another region of the image. If the system fails to identify the images or recognizes them with low confidence level, it will alarm the operator to identify the images manually.

Figure 3:
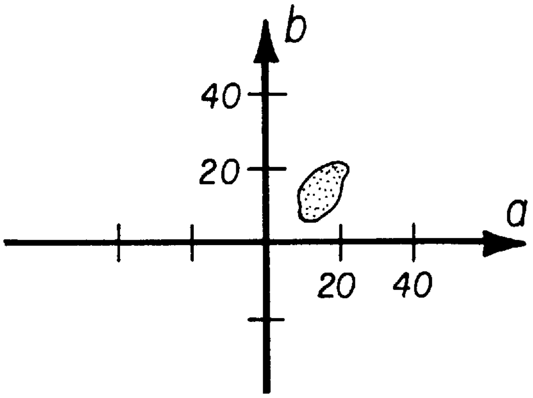
FIG. 3 illustrates L*a*b* color space with skin tone coloration identified in the highlighted area.

If the customer had asked for special treatment of his close-up shots, the system would have had to identify those frames as well. Below is a method to recognize close-up portrait scenes. FIGS. 2 and 3 show how this is done. By segmenting the pre-scan data of each frame into several centralized sections like FIGS. 2*a*–2*d*, one could analyze the image densities in these areas. The important portion of a portrait scene, i.e., is the subject's face and is usually located in the center of the frame in sections B or A. The skin tones for all races and coloring is usually clustered in a certain area of L*a*b* space, as shown in FIG. 3. The IDM 30 will examine the data points from each frame in section B and if they fall within the skin tone cluster, it would mark that frame as a "portrait" frame.

It is understood that the operator will instruct the IDM 30 to search for certain type images, according to customer print characterizations. The operator will have a list of options for image recognition based on the capabilities of the algorithms loaded into the IDM 30. At the end of pre-scanning each roll and identifying the images, the IDM 30 could display the identified images and ask the operator to confirm or reject the recognition results.

Once all the film frames are identified and marked, the system is ready to scan the film for the second time and make prints from that data. The second scan, or the high resolution scan, generates the image data needed for electronic printing. The high resolution scan consists of 1024 by 1536 or 2048 by 3072 pixels per frame. The scanned data for normal sized prints consist of 1024 pixels by 1536 lines. The frame store 40 is filled with this data directly from scanner 32 through the SCSI channel 34. Once enough data is stored in frame store 40 to make a full page print, the printing begins. For the multi-prints (four copies of indoor group scenes), the CPU 38 will instruct frame store 40 to retrieve those images as many times as needed (four in this case), before the next image is retrieved and exposed. For the rest of normal sized prints, they are scanned by scanner 32, stored in frame store 40, and exposed by laser writer 52 sequentially.

For the enlargement prints (8Rs for the outdoor garden scenes), IDM 30 will instruct the scanner 32 to scan those frames at full resolution of 2048 pixels by 3072 lines. For larger prints higher resolution is needed otherwise the photograph will look unsharp with many stair-casing effects. Only a few of these high resolution image data files are enough to fill the frame store 40. The interpolation ratio of the interpolator 42 is changed accordingly to produce the 8R prints properly. By now, the photofinisher has the complete order of the photographer ready for him to pick up.

In the above case, all the 4R prints were made first and all the 8R prints were made separately. This is usually the most efficient method for printing orders with multiple size prints, i.e., print all the prints of the smallest size first, print all the prints of next size up next, print all the prints of the largest size last. Images of the same size are "ganged up" in a large print sheet until the sheet is full. For example, nine 4R prints will fill up a 12"×18" sheet completely. If fewer than nine 4R prints are requested, some areas of the 12"×18" paper would stay blank and get wasted. Similarly, only two 8"×10" (or 8"×12") prints could fit on a 12"×18" sheet. These arrangements are explained in more detail in U.S. Pat. No. 4,994,827.

Figure 8A:
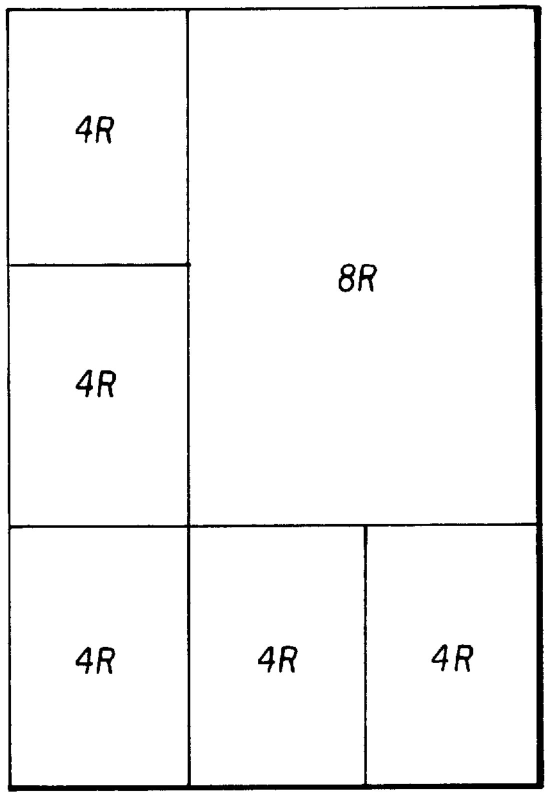
FIGS. 8a and 8b illustrate examples of how 12×18 sheets are made to accommodate different size prints in various combinations of sizes.
Figure 8B:
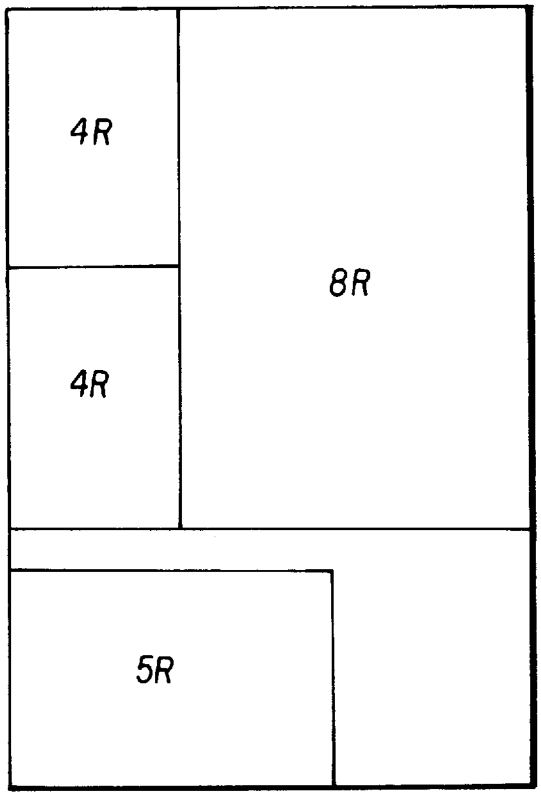

Another alternative in the way prints are made is to fit different size prints on the same 12"×18" sheet. For example, two 4Rs and one 8R could be printed side by side, filling a 12"×12" square area of a page. The rest of the sheet could be filled with three 4Rs or one 5R as shown in FIG. 8. Notice in FIG. 8*b*, three different size images are printed on one sheet. The 4R and 5R images are normally scanned by the scanner 32 at medium resolution of 1024 pixels by 1536 lines. Because the interpolator 42 cannot change its interpolation ratio in the middle of printing a page, the image data for the 5R print is interpolated up by the ratio of 5R/4R or 1.24. This interpolation is done in the IDM software. This way the interpolator 42 will operate at only one ratio when it is printing the page shown in FIG. 8*b*. Notice the 8R image was scanned at a high resolution of 2048 by 3072 but it is twice as large as the 4R print. Therefore, the interpolator 42 does not need to change interpolation ratio as it prints the 4R and 8R prints.

To compute the correct interpolation ratio, one must look at the resolution of the input scans and the size of the output print desired. As mentioned earlier for 8R prints and larger, the image is scanned at high resolution of 2048×3072. For smaller prints, the images are scanned at 1024×1536. Therefore, if a 4R print is desired, the interpolation ratio will be (4"×500 dpi)/1024=1.953. For a 12R print, the ratio should be set at (12"×500 dpi)/2048=2.930. The assumption is that the printer resolution is 500 dpi.

Figure 9:
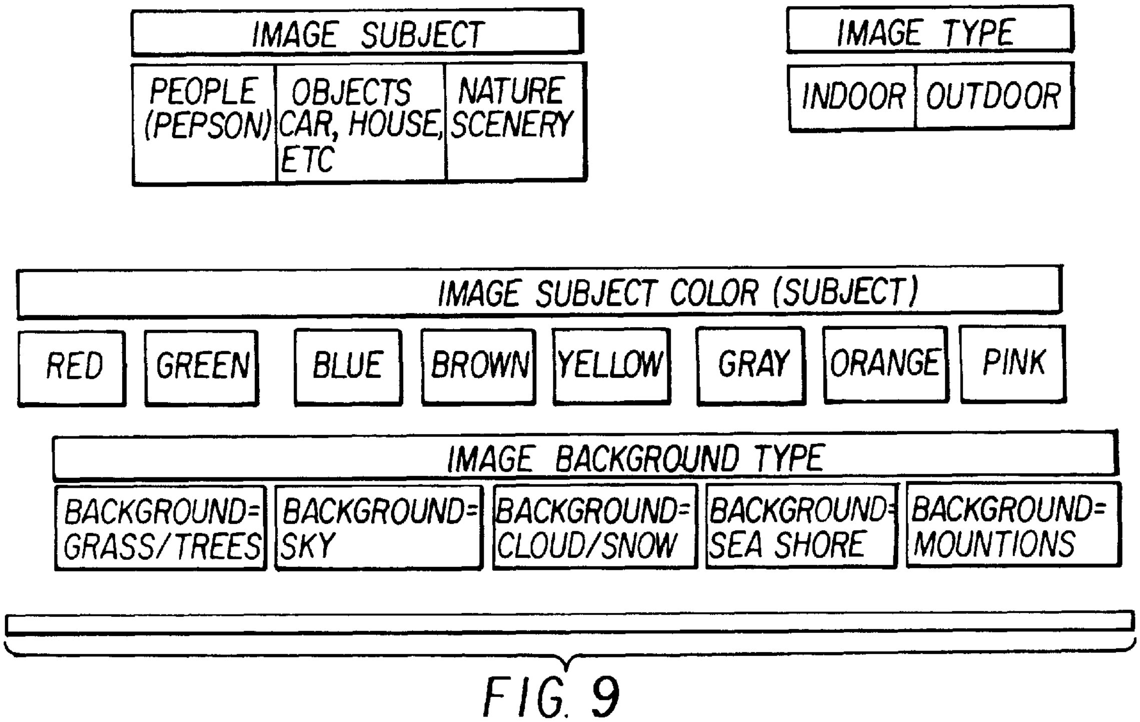
FIG. 9 shows an interface menu that the operator would use to input image related characteristics into the novel system.

FIG. 9 shows the operator interface menu associated with the present system. For each image that the customer has asked to be treated differently, a menu like FIG. 9 is followed. The operator will select as many of the menu options that are appropriate, based on the information the customer has provided. The more characteristics of the image that can be specified, the more likely their identification will be correct. One important characteristic that must be defined is "image subject". In FIG. 9, three options are given: (1) people; (2) objects; and (3) scenery. Once one of these is selected by the operator, an "image subject color" sub-menu appears, as shown in the middle of FIG. 9. If the customer has indicated the color of the subject, it will be selected for the color choices in the menu. If the subject color was not indicated by the customer, this sub-menu is by-passed. The "image type" characteristic allows two options: (1) indoors and (2) outdoors. "Image background type" is another characteristic that may have been defined by the customer. The options for this category are listed in the bottom of FIG. 9.

As mentioned before, it is not necessary to select the entries of all the menus and sub-menus. But the more that are selected to define the target image, the easier and more reliable the recognition process can be. For example, to identify the garden scenes from the case explained earlier, the operator would select the following options from the corresponding menus: (1) "image subject"=nature scenery; (2) "image type"=outdoor; (3) "image background"=grass/trees; and (4) "image subject color"=green. If the operator had only identified the first two characteristics, the identification program shown in FIG. 7 would probably pinpoint the correct image frame. But if the operator had identified three or all four of the above characteristics, the target image would be found more quickly and with greater accuracy.

Figure 10:
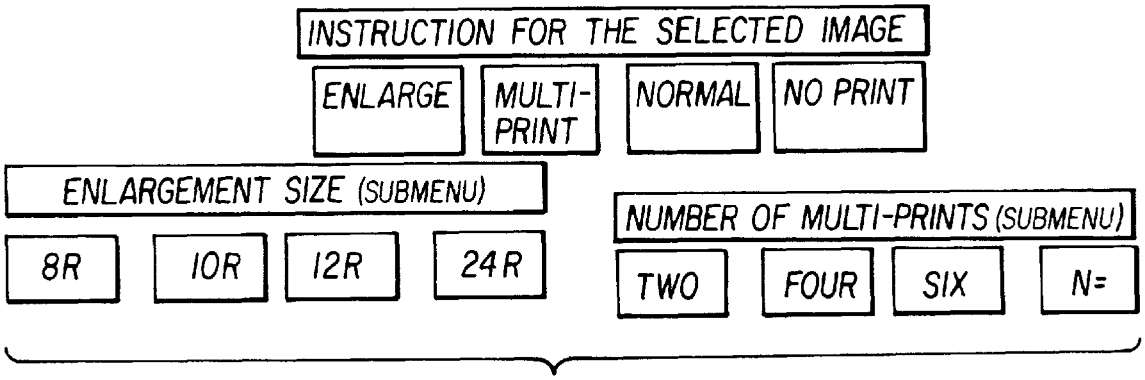
FIG. 10 shows a main menu and sub-menu where the operator inputs instruction as to what the printer is to do when the correct image is located.

FIG. 10 shows the main menu and its sub-menus indicating what the printer should do when the identified image is located. As mentioned before, the main options could be: (1) enlarge it; (2) make multiple copies; (3) make normal print; and (4) do not print. The sub-menus then assist in defining the size of enlargement or the number of multi-prints.

Without the use of this system, the photographer would have had to make two additional trips to the photofinisher—one to place the special order for the multi-prints and the enlargements, and the second trip to pick up his finished prints.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. An apparatus for making prints from a strip carrying a plurality of distinct printable image frames, said apparatus comprising:

a keyboard for inputting the number of prints to be made of particular ones of the image frames and a criterion representing a characteristic of the image within an image frame that is to be used to identify the particular image frame;

a film scanner for scanning the images within each image frame and generating signals representing the images scanned;

a computer programmed to analyze the scanned images and the particular image frames based on the criterion; and a printer for printing the particular images according to the number inputted having those characteristics of the particular image frames wherein the computer is programmed to analyze the pre-scan data to identify indoor versus outdoor scenes by comparing the peripheral and central densities of an image.

2. An apparatus as set forth in claim 1 wherein said printer prints enlargements of a selected image.

3. An apparatus as set forth in claim 1 wherein said printer prints multiple prints of a selected image.

4. An apparatus as set forth in claim 1 wherein said film scanner re-scans said selected images at a higher resolution.

5. An apparatus for making prints from a strip carrying a plurality of distinct printable image frames, said apparatus comprising:

a keyboard for inputting the number of prints to be made of particular ones of the image frames and a criterion representing a characteristic of the image within an image frame that is to be used to identify the particular image frame;

a film scanner for scanning the images within each image frame and generating signals representing the images scanned;

a computer programmed to analyze the scanned images and the particular image frames based on the criterion; and a printer for printing the particular images according to the number inputted having those characteristics of the particular image frames wherein the computer is programmed to identify background color of outdoor scenes using color histograms of the peripheral regions of an image.

6. An apparatus as set forth in claim 5 wherein said printer prints enlargements of a selected image.

7. An apparatus as set forth in claim 5 wherein said printer prints multiple prints of a selected image.

8. An apparatus as set forth in claim 5 wherein said film scanner re-scans said selected images at a higher resolution.

9. An apparatus for making prints from a strip carrying a plurality of distinct printable image frames, said apparatus comprising:

a keyboard for inputting the number of prints to be made of particular ones of the image frames and a criterion representing a characteristic of the image within an image frame that is to be used to identify the particular image frame;

a film scanner for scanning the images within each image frame and generating signals representing the images scanned;

a computer programmed to analyze the scanned images and the particular image frames based on the criterion; and a printer for printing the particular images according to the number inputted having those characteristics of the particular image frames wherein the computer is programmed to identify portraits by using color histograms of the color channels to locate flesh tones in the central region of an image.

10. An apparatus as set forth in claim 9 wherein said printer prints enlargements of a selected image.

11. An apparatus as set forth in claim 9 wherein said printer prints multiple prints of a selected image.

12. An apparatus as set forth in claim 9 wherein said film scanner re-scans said selected images at a higher resolution.

13. A method of selectively making prints from a film strip carrying at least a plurality of distinct printable images, said method comprising the steps of:

generating data by scanning the images on the film strip;

using image-related characteristics for distinguishing between printable images;

storing and using the data to locate images having the image-related characteristics; and printing all printable images wherein different numbers of prints are made of the printable images having the image-related characteristics than are made of the printable images not having the image-related characteristics wherein the step of locating images further includes identifying indoor versus outdoor scenes by comparing the peripheral and central densities of an image.

14. The method as set forth in claim 13 wherein the printing step further includes the printing of a predetermined number of enlargements of a selected image.

15. The method as set forth in claim 13 wherein the printing step further includes the printing of multiple prints of a selected image.

16. An apparatus as set forth in claim 13 wherein said film scanner re-scans said selected images at a higher resolution.

17. A method of selectively making prints from a film strip carrying at least a plurality of distinct printable images, said method comprising the steps of:

generating data by scanning the images on the film strip;

using image-related characteristics for distinguishing between printable images;

storing and using the data to locate images having the image-related characteristics; and printing all printable images wherein different numbers of prints are made of the printable images having the image-related characteristics than are made of the printable images not having the image-related characteristics wherein the step of locating images further includes identifying background color of outdoor scenes using color histograms of the peripheral regions of an image.

18. The method as set forth in claim 17 wherein the printing step further includes the printing of a predetermined number of enlargements of a selected image.

19. The method as set forth in claim 17 wherein the printing step further includes the printing of multiple prints of a selected image.

20. An apparatus as set forth in claim 17 wherein said film scanner re-scans said selected images at a higher resolution.

21. A method of selectively making prints from a film strip carrying at least a plurality of distinct printable images, said method comprising the steps of:

generating data by scanning the images on the film strip;

using image-related characteristics for distinguishing between printable images;

storing a nd using the data to locate images having the image-related characteristics; and printing all printable images wherein different numbers of prints are made of the printable images having the image-related characteristics than are made of the printable images not having the image-related characteristics wherein the step of storing and using data to locate images further includes identifying portraits by using color histograms of the color channels to indicate flesh tones in the central region of the image.

22. The method as set forth in claim 21 wherein the printing step further includes the printing of a predetermined number of enlargements of a selected image.

23. The method as set forth in claim 21 wherein the printing step further includes the printing of multiple prints of a selected image.

24. An apparatus as set forth in claim 21 wherein said film scanner re-scans said selected images at a higher resolution.

25. An apparatus for printing film images from a strip carrying a plurality of printable images according to specified printing instructions associated with images to be identified by image-related characterizations, said apparatus comprising:

a film scanner for scanning the film to provide pre-scan image data;

a memory containing a plurality of image analyses techniques to select from to analyze the pre-scan image data to identify specific image-related characteristics;

a keyboard for inputting printing instructions based on image-related characterization;

a computer to select and execute the analyses techniques contained in memory to be implemented based on image-related characterizations; and a printer controlled by said computer for printing all printable images wherein a different number of prints are made of the printable images having the image-related characteristics than are made of the printable images not having the image-related characteristic wherein said memory contains an analyses technique in the form of a program to identify indoor versus outdoor scenes by comparing the peripheral and central densities of an image.

26. An apparatus as set forth in claim 25 wherein said printer prints enlargements of a selected image.

27. An apparatus as set forth in claim 25 wherein said printer prints multiple prints of a selected image.

28. An apparatus as set forth in claim 25 wherein said film scanner re-scans said selected images at a higher resolution.

29. An apparatus for printing film images from a strip carrying a plurality of printable images according to specified printing instructions associated with images to be identified by image-related characterizations, said apparatus comprising:

a film scanner for scanning the film to provide pre-scan image data;

a memory containing a plurality of image analyses techniques to select from to analyze the pre-scan image data to identify specific image-related characteristics;

a keyboard for inputting printing instructions based on image-related characterization;

a computer to select and execute the analyses techniques contained in memory to be implemented based on image-related characterizations; and a printer controlled by said computer for printing all printable images wherein a different number of prints are made of the printable images having the image-related characteristics than are made of the printable images not having the image-related characteristic wherein the computer is programmed to identify background color of outdoor scenes using color histograms of the peripheral regions of an image.

30. An apparatus as set forth in claim 29 wherein said printer prints enlargements of a selected image.

31. An apparatus as set forth in claim 29 wherein said printer prints multiple prints of a selected image.

32. An apparatus as set forth in claim 29 wherein said film scanner re-scans said selected images at a higher resolution.

33. An apparatus for printing film images from a strip carrying a plurality of printable images according to specified printing instructions associated with images to be identified by image-related characterizations, said apparatus comprising:

a film scanner for scanning the film to provide pre-scan image data;

a memory containing a plurality of image analyses techniques to select from to analyze the pre-scan image data to identify specific image-related characteristics;

a keyboard for inputting printing instructions based on image-related characterization;

a computer to select and execute the analyses techniques contained in memory to be implemented based on image-related characterizations; and a printer controlled by said computer for printing all printable images wherein a different number of prints are made of the printable images having the image-related characteristics than are made of the printable images not having the image-related characteristic wherein the computer is programmed to identify portraits by using color histograms of the color channels to locate flesh tones in the central region of an image.

34. An apparatus as set forth in claim 33 wherein said printer prints enlargements of a selected image.

35. An apparatus as set forth in claim 33 wherein said printer prints multiple prints of a selected image.

36. An apparatus as set forth in claim 33 wherein said film scanner re-scans said selected images at a higher resolution.

* * * * *